Oct. 4, 1966  T. L. GREENWOOD  3,277,458
CONDITION AND CONDITION DURATION INDICATOR
Filed June 26, 1963
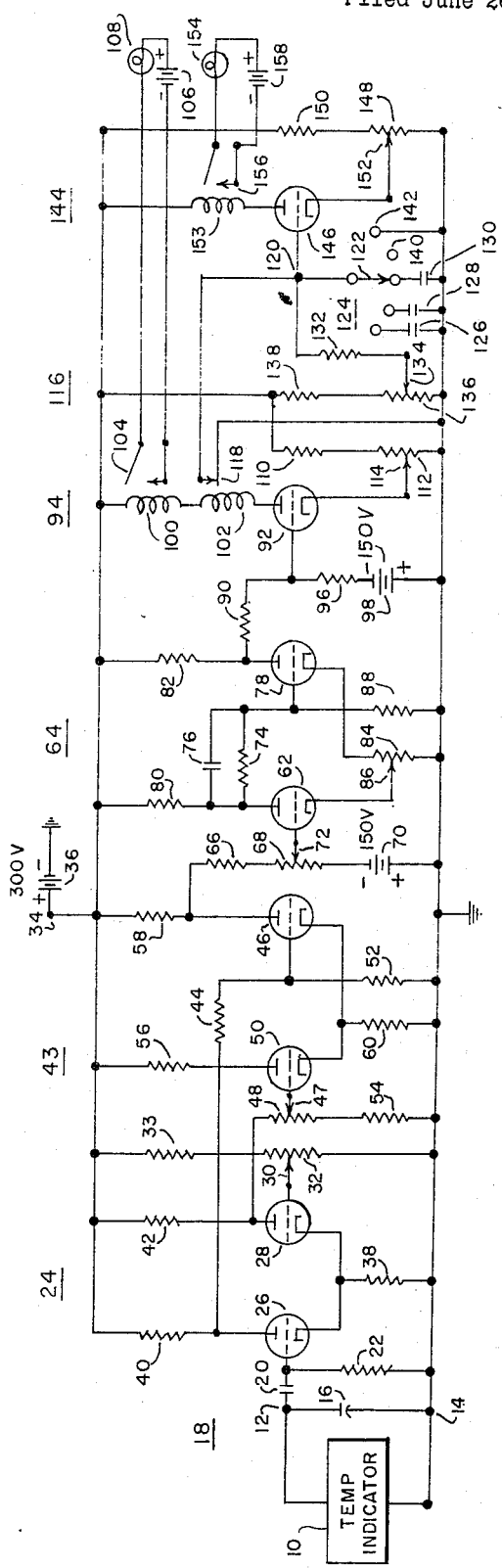
THOMAS L. GREENWOOD,
INVENTOR.
BY
*J. V. O'Brien*
*C. A. Phillips*
ATTORNEYS

United States Patent Office 3,277,458
Patented Oct. 4, 1966

3,277,458
CONDITION AND CONDITION DURATION INDICATOR
Thomas L. Greenwood, Huntsville, Ala., assignor to the United States of America as represented by the Administrator of the National Aeronautics and Space Administration
Filed June 26, 1963, Ser. No. 290,873
8 Claims. (Cl. 340—227)

The invention described herein may be manufactured and used by or for the Government of the United States of America for governmental purposes without the payment of any royalties thereon or therefor.

This invention relates to electrical systems for indicating the existence of a physical condition electrically presented and particularly to a system for detecting the presence of a condition and indicating when this condition has existed for a predetermined period.

There are applications where there is a requirement that some physical condition, such as for example temperature, be monitored and upon the occurrence of a critical condition such as an excessive rate of change of temperature, that the period of excessive rate be timed; and, if this rate continues for a critical duration that some indication, such as an alarm, be manifested.

It is an object of this invention to provide a condition responsive system for effectively monitoring a physical condition electrically presented and precisely indicating when a critical condition occurs and has existed for a critical period of time.

Another object of this invention is to provide a system of the character described wherein the rate of change of the condition being monitored is the initial critical factor and the system provides a very precise means of examining this rate and of indicating when the critical rate has existed for a predetermined period.

In accordance with the invention a voltage representative of a condition to be monitored is applied to differential means to which is also applied a reference voltage representative of some critical condition. The differential means compares the two applied voltages and provides an output indicative of the difference between them, if any. This output is then applied to circuit means, such as a Schmidt trigger, which produces an abrupt electrical change as a trigger output, whenever the output from the differential means indicates that the input condition voltage has varied in a critical direction, positive or negative as selected, from the reference voltage. The trigger output is applied to initiate a timing circuit which provides means for signaling or indicating whenever the timing circuit has been operated for a predetermined time.

Other objects, features and advantages of the present invention will be apparent from the following detailed description when considered together with the accompanying drawing showing an electrical schematic diagram of an embodiment of the invention.

Referring now to the drawing, temperature indicator 10 measures the temperature of an environment, not illustrated, and provides a direct current voltage across terminals 12 and 14 which varies directly with temperature and is positive at terminal 12 with respect to terminal 14. This temperature voltage is filtered by lowpass filter capacitor 16 (e.g. 25 mfd.) connected across terminals 12 and 14. Rate circuit 18 is energized by terminals 12 and 14 and consists of capacitor 20 (e.g. 1 mfd.) and resistor 22 (e.g. 100K ohms) connected in series.

The output of rate circuit 18, across resistor 22, is applied to one input of differential amplifier 24, being fed between terminal 14 at ground potential and the grid of triode 26. A reference voltage is fed to the grid input of triode 28 from movable terminal 30 of potentiometer 32, connected between ground and through resistor 33 to positive terminal 34 of 300 volt direct current source 36. The negative terminal of source 36 is connected to ground. The cathodes of triodes 26 and 28 are connected together through common cathode resistor 38 (e.g. 2K ohms) to ground. The anode of triode 26 is connected through anode resistor 40 (e.g. 1 mohm) to plus terminal 34 and an identical anode resistor 42 is connected between the anode of triode 28 and plus terminal 34.

The output of differential amplifier 24 is further amplified in differential amplifier 43, the anode of triode 26 being direct current connected through resistor 44 (e.g. 100K ohms) to the grid of triode 46 and the anode of triode 28 being direct current connected through movable arm 47 of balancing potentiometer 48 (e.g. 500K ohms) to the grid of triode 50. The direct current circuit to triode 46 is completed by resistor 52 being connected between grid and ground and the input circuit of triode 50 being completed by resistor 54 (e.g. 1 mohm) connected between ground and one end terminal of potentiometer 48, the other end terminal of potentiometer 48 being connected to the anode of triode 28. Anode resistors 56 and 58 (e.g. 100,000 ohms) connect, respectively, the anodes of triodes 50 and 46 to plus terminal 34. The cathodes of triodes 46 and 50 are connected through common cathode resistor 60 (e.g. 25K ohms) to ground.

An output of differential amplifier 43 is coupled to the grid input of triode 62 which is the input stage of Schmidt trigger circuit 64. Direct current coupling is employed by means of a series circuit consisting of resistor 66, potentiometer 68 and negative grid bias source 70, wherein an otherwise free terminal of resistor 66 is connected to the anode of triode 46, a movable arm 72 of potentiometer 68 is connected to the grid of triode 62 and the positive terminal of bias source 70 (e.g. 150 volts) is connected to ground. By this biasing configuration triode 62 is maintained in an "off" condition whenever triodes 26 to 28 and triodes 46 and 50 are operating in a balanced mode with no critical input to triode 26 from temperature indicator 10. The anode of triode 62 is direct current coupled through resistor 74 (e.g. 200K ohms), paralled by accelerating capacitor 76 to the grid of the second stage triode 78 of Schmidt trigger 64. The anode of triode 62 is connected to source terminal 34 through resistor 80 (e.g. 100K ohms) and the anode of triode 78 is connected through resistor 82 to terminal 34. The cathode of triode 78 is connected through potentiometer 84 to ground and the cathode of triode 62 is connected through movable terminal 86 of potentiometer 84 to ground. The grid circuit of triode 78 is completed by grid resistor 88 (e.g. 200K ohms) connected between the grid of triode 78 and ground.

The output of Schmidt trigger circuit 64 is coupled through direct current coupling resistor 90 between the anode of triode 78 and grid of triode 92 of a first relay driving circuit 94, the coupling circuit consisting additionally of resistor 96 connected between the grid of triode 92 and ground through negative grid bias source 98 (e.g. 150 volts). Relay coils 100 and 102 are connected in series between the anode of triode 92 and plus source terminal 34. When coil 100 is energized it closes contacts 104 which then close a circuit through power source 106 and signal warning lamp 108. As will be further explained below, this occurs when a critical input is applied to differential amplifier 24 from indicator 10. An adjustable cathode grid bias for triode 92 is obtained from a voltage divider circuit consisting of resistor 110 (e.g.

100K ohms) connected in series with potentiometer 112, one end terminal of resistor 110 being connected to plus source terminal 34 and one end terminal of potentiometer 112 being connected to ground. Movable arm 114 of potentiometer 112 is connected to the cathode of triode 92.

Timing circuit 116 is initiated upon the energization of coil 102 which controls contacts 118. As stated above, this occurs upon a critical signal being applied to the input of differential amplifier 24 and serves to remove a shorting-to-ground connection made to terminal 120 which is connected to movable arm 122 of timing selector switch 124. This allows a charging current to be applied to capacitor 126 (e.g. 1 mfd.), 128 (e.g., 5 mfd.), or 130 (e.g. .25 mfd.) depending upon the position of movable arm 122. Charging current is applied through resistor 132 (e.g. 2 mohms) from movable arm 134 of potentiometer 136 (e.g. 10K ohms) connected in series with resistor 138 between plus terminal 34 and ground. Switch 114 also provides a no-delay switch position 140 and off position 142.

The output of timing circuit 116, available at terminal 120, is applied to a second relay control circuit 144, being connected between the grid and cathode of triode 146 through the lower portion of potentiometer 148. Potentiometer 148 is connected between ground and plus terminal 34 through resistor 150 (e.g. 100K ohms) with the movable arm 152 of potentiometer 148 being connected to the cathode of triode 146.

An output of relay control circuit 144 is manifested by relay coil 153 being energized in response to a predetermined rise in voltage at terminal 120 connected to the grid of triode 146. This rise is time dependent upon the time constant of the resistance-capacitance circuit determined by the setting of switch 124 and thus will occur at a predetermined time after a critical voltage has been applied to differential amplifier 24. In this manner a critical period following the occurrence of a critical condition is signaled and is manifested by energization of alarm lamp indicator 154 by virtue of contacts 156 being closed under the influence of anode circuit relay coil 153 creating a closed circuit between power source 158 and alarm lamp indicator 154.

In operation, temperature indicator 10 applies a voltage across capacitor 16 indicative of the temperature registered by indicator 10. Capacitor 16 being of fairly large value, e.g., 25 mfd. as suggested above, responds in a manner to filter any rapid and spurious signals and allows only actual changes in temperature derived voltages to appear across it. Capacitor 20 and resistor 22 form a differentiation or rate circuit across capacitor 16 which provides an input voltage to triode 26 which is proportional to the rate of change in temperature registered by temperature indicator 10. Movable arm 30 of potentiometer 32 is adjusted to a position which will provide a reference grid voltage to triode 28 corresponding to a desired critical rate voltage applied to triode 26. Thus, differential amplifier 24 will provide a differential signal to differential amplifier 43 whenever the rate and reference voltage differ. In order to assure balance on the part of differential amplifier 43, whenever differential amplifier 24 is in a balanced position, movable arm 47 of potentiometer 48 is initially adjusted to provide equal voltages at the anodes of triodes 46 and 50. The circuitry described in the preceding paragraph is generally arranged to produce responses to rises in temperature, as the anode of triode 26 is connected to drive the grid of triode 46 and the anode of triode 28 is connected to drive the grid of triode 48. A rising voltage, indicating a critical rise in temperature will appear at the input of Schmidt trigger circuit 64 whenever the rate voltage applied to the input of triode 26 is greater than the reference voltage applied to the input of triode 28. Without such rising input to the input of Schmidt trigger 64, which input is applied to the grid of triode 62, triode 62 is biased just below cutoff so that a slight rise in input will cause triode 62 to conduct. When this rise occurs triode 62 turns on very abruptly due to the regenerative configuration of the Schmidt trigger in which the anode of input triode 62 is connected to the grid of output triode 78 and the output of triode 78 is coupled back by common cathode resistor 84 to input triode 62.

Triode 78 is thus caused to abruptly turn off and provide an abruptly rising output voltage to the input of otherwise cutoff triode 92 of first relay control circuit 94. This causes triode 92 to conduct. As it conducts, relay coils 100 and 102 are energized, coil 100 causing contacts 104 to close energizing warning light 108 and coil 102 causing relay contacts 118 to close initiating operation of timing circuit 116. By adjustment of movable arm 114 of potentiometer 112 triode 92 may be precisely adjusted to a position providing cathode grid bias just below conduction for triode 92 without signal from Schmidt trigger 64.

Assume now that it is desired to provide an indication by alarm signal lamp 154 whenever the excessive temperature rise which has triggered timing circuit 116 exists for a selected critical period basically set by the position of contact 122. First, movable arm 152 of potentiometer 148 is adjusted to provide a cutoff bias between the cathode and grid of triode 146 which bias will be overcome only after the charging current through potentiometer 136 and resistor 132 provide a charge potential across capacitor 130 (in the indicated setting) sufficient to cancel the cathode bias across potentiometer 148 and produce a conduction bias. Fine adjustment of the time constant of timing circuit 116 for any time setting of switch 124 is accomplished by adjustment of movable arm 134 of potentiometer 136.

When the rise in potential across capacitor 130 is sufficient to cause triode 146 to conduct, marking the end of a timing period, relay coil 153 is energized and it in turn closes contacts 156 causing alarm lamp indicator 154 to turn on. When this occurs a full cycle of operation has been completed. Two significant conditions have been indicated. The first indication, by energization of warning lamp 108, being that temperature indicator 10 registers a critical temperature rise rate. The second condition, indicated by energization of alarm lamp 154, signals that the critical temperature rise rate has existed for a predetermined, and normally critical, period.

While the circuitry described is adapted to treat rates of increase, by simple reversal of the interconnection between the outputs of differential amplifier 24 and differential amplifiers 43 rate decreases may be signaled. If the existence of a critical input condition rather than a critical rate of change of this condition is to be observed, rate circuit 16 may simply be omitted. Similarly, it is to be appreciated that still other variations of circuitry may be made without departing from the true scope of the invention as defined in the appended claims.

I claim:
1. A combined condition and condition duration indicator comprising:
 (a) input means responsive to an electrical input for deriving a first output voltage proportional to a condition of said electrical input;
 (b) reference means for developing a second and predetermined electrical output;
 (c) differential means responsive to said first and second electrical outputs for providing an electrical output representative of the difference between said first and second outputs;
 (d) trigger means responsive to an output of said differential means for providing an abrupt output in response to an unbalance of predetermined direction of said first and second outputs;
 (e) switching means responsive to an output of said trigger means for providing a first and second electrical switching outputs;

(f) first indicating means responsive to said first switching output for registering the occurrence of unbalance between said first and second outputs;

(g) timing means responsive to said second switching output for generating a voltage proportional to time;

(h) second indicating means responsive to the output of said timing means for registering when the output of said timing means reaches a predetermined value.

2. A combined condition and condition duration indicator comprising:

(a) input means responsive to an electrical input for deriving a first output voltage proportional to the rate of change of said electrical input;

(b) reference means for developing a second and predetermined electrical output;

(c) differential means responsive to said first and second electrical outputs for providing an electrical output representative of the difference between said first and second outputs;

(d) trigger means responsive to an output of said differential means for providing an abrupt output in response to an unbalance of predetermined direction of said first and second outputs;

(e) switching means responsive to an output of said trigger means for providing a first and second electrical switching outputs;

(f) first indicating means responsive to said first switching output for registering the occurrence of unbalance between said first and second outputs;

(g) timing means responsive to said second switching output for generating a voltage proportional to time;

(h) second indicating means for registering when the output of said timing means reaches a predetermined value.

3. A combined condition and condition duration indicator comprising:

(a) input means responsive to an electrical input for deriving a first output voltage proportional to the rate of change of direct current of said electrical input;

(b) reference means for developing a second and adjustable electrical output;

(c) differential means responsive to said first and second electrical outputs for providing an electrical output representative of the difference between said first and second outputs;

(d) trigger means responsive to an output of said differential means for providing an abrupt output in response to an unbalance of said first and second outputs wherein said first output exceeds said second output;

(e) switching means responsive to an output of said trigger means for providing a first and second electrical switching outputs;

(f) first indicating means responsive to said first switching output for registering the occurrence of said unbalance between said first and second outputs;

(g) timing means responsive to said second switching output for generating a voltage proportional to time;

(h) second indicating means responsive to the output of said timing means for registering when the output of said timing means reaches a predetermined value.

4. A combined condition and condition duration indicator comprsing:

(a) input means responsive to an electrical input for deriving a first output voltage proportional to the rate of change of direct current of said electrical input;

(b) reference means for developing a second and adjustable electrical output;

(c) differential amplification means responsive to said first and second electrical outputs for providing an electrical output representative of the difference between said first and second outputs;

(d) trigger means responsive to an output of said differential means for providing an abrupt output in response to an unbalance of said first and second outputs wherein said first output exceeds in a positive direction said second output;

(e) switching means responsive to an output of said trigger means for providing a first and second electrical switching outputs;

(f) first indicating means responsive to said first switching output for registering the occurrence of said unbalance between said first and second outputs;

(g) timing means responsive to said second switching output for generating a voltage proportional to time;

(h) second indicating means responsive to the output of said timing means for registering when the output of said timing means reaches a predetermined value.

5. A combined condition and condition duration indicator comprising:

(a) input means responsive to an electrical input for deriving a first output voltage proportional to the rate of rise in a positive direction of said electrical input;

(b) reference means for developing a second and adjustable electrical output;

(c) differential means responsive to said first and second electrical outputs for providing an electrical output whenever said first output exceeds said second output;

(d) trigger means responsive to an output of said differential means for providing an abrupt output in response to an unbalance of said first and second outputs wherein said first output exceeds in a positive direction said second output;

(e) switching means responsive to an output of said trigger means for providing a first and second electrical switching outputs;

(f) first indicating means responsive to said first switching output for registering the occurrence of unbalance between said first and second outputs;

(g) timing means responsive to said second switching output for generating a voltage proportional to time;

(h) second indicating means responsive to the output of said timing means for registering when the output of said timing means reaches a predetermined value.

6. A combined condition and condition duration indicator comprising:

(a) input means for deriving a first output voltage proportional to an input condition;

(b) reference means for developing a second and predetermined electrical output;

(c) differential amplification means responsive to said first and second electrical outputs for providing an electrical output representative of the difference between said first and second outputs;

(d) trigger means responsive to an output of said differential means for providing an abrupt output in response to an unbalance of said first and second outputs wherein said first output exceeds in a positive direction said second output;

(e) switching means responsive to an output of said trigger means for providing a first and second electrical switching outputs;

(f) first indicating means responsive to said first switching output for registering the occurrence of unbalance between said first and second outputs;

(g) timing means responsive to said second switching output for generating a voltage proportional to time;

(h) second indicating means responsive to the output of said timing means for registering when the output of said timing means reaches a predetermined value.

7. A combined condition and condition duration indicator comprising:

(a) temperature indicating means for deriving a first output voltage proportional to changes in temperature;

(b) reference means for developing a second and predetermined electrical output;

(c) differential means responsive to said first and second electrical outputs for providing an electrical output representative of the difference between said first and second outputs;

(d) trigger means responsive to an output of said differential means for providing an abrupt output in response to an unbalance of predetermined direction of said first and second outputs;

(e) switching means responsive to an output of said trigger means for providing a first and second electrical switching outputs;

(f) warning means responsive to said first switching output for signaling the occurrence of unbalance between said first and second outputs;

(g) timing means responsive to said second switching output for generating a voltage proportional to time;

(h) alarm means responsive to the output of said timing means for signaling when the output of said timing means reaches a predetermined value.

8. A combined condition and condition duration indicator comprising:

(a) temperature measuring means for deriving a first output voltage proportional to rates of increase of temperature;

(b) reference means for developing a second and adjustable reference electrical output;

(c) differential means responsive to said first and second electrical outputs for providing an electrical output representative of the difference between said first and second outputs;

(d) trigger means responsive to an output of said differential means for providing an abrupt output in response to an unbalance of said first and second outputs wherein said first output exceeds in a positive direction said second output;

(e) switching means responsive to an output of said trigger means for providing a first and second electrical switching outputs;

(f) first indicating means responsive to said first switching output for registering the occurrence of unbalance between said first and second outputs;

(g) timing means responsive to said second switching output for generating a voltage proportional to time;

(h) second indicating means responsive to the output of said timing means for registering when the output of said timing means reaches a predetermined value.

References Cited by the Examiner

UNITED STATES PATENTS

| 2,762,034 | 9/1956 | Joyce et al. | |
| 2,907,012 | 9/1959 | Pitman et al. | 340—213 |
| 2,941,192 | 6/1960 | Postal. | |

FOREIGN PATENTS 1,217,202  12/1959  France.

NEIL C. READ, *Primary Examiner.*

R. ANGUS, D. YUSKO, *Assistant Examiners.*